United States Patent
Kodaira et al.

(10) Patent No.: US 12,172,351 B2
(45) Date of Patent: Dec. 24, 2024

(54) MANUFACTURING METHOD, INJECTION MOLDING SYSTEM, AND MOLD

(71) Applicant: Canon Virginia, Inc., Newport News, VA (US)

(72) Inventors: Koki Kodaira, Tokyo (JP); Yuichi Yanahara, Moriyama (JP)

(73) Assignee: Canon Virginia, Inc., Newport News, VA (US)

( * ) Notice: Subject to any disclaimer, the term of this patent is extended or adjusted under 35 U.S.C. 154(b) by 509 days.

(21) Appl. No.: 17/611,417

(22) PCT Filed: May 13, 2020

(86) PCT No.: PCT/US2020/032733
§ 371 (c)(1),
(2) Date: Nov. 15, 2021

(87) PCT Pub. No.: WO2020/236489
PCT Pub. Date: Nov. 26, 2020

(65) Prior Publication Data
US 2022/0203587 A1    Jun. 30, 2022

Related U.S. Application Data

(60) Provisional application No. 62/849,661, filed on May 17, 2019.

(51) Int. Cl.
  *B29C 45/17*    (2006.01)
  *B29C 45/04*    (2006.01)
  (Continued)

(52) U.S. Cl.
  CPC ...... *B29C 45/1756* (2013.01); *B29C 45/0408* (2013.01); *B29C 45/28* (2013.01);
  (Continued)

(58) Field of Classification Search
  CPC ... B29C 45/12; B29C 45/125; B29C 45/2673; B29C 2045/2679; B29C 45/0416;
  (Continued)

(56) References Cited

U.S. PATENT DOCUMENTS 3,063,092 A  *  11/1962  Fischer ................. B29C 49/56
                                                425/538
3,417,433 A  *  12/1968  Teraoka ................. B29C 45/07
                                                264/328.8
(Continued)

FOREIGN PATENT DOCUMENTS

JP        2003-300230 A    10/2003
JP         6121601 B1       4/2017
(Continued)

*Primary Examiner* — Emmanuel S Luk
(74) *Attorney, Agent, or Firm* — Canon U.S.A. Inc., IP Division

(57) ABSTRACT

A method for manufacturing a molded part by an injection molding machine while changing between multiple molds, the method including transporting a stack mold including an intermediate mold to a molding operation position inside the injection molding machine, wherein the intermediate mold includes a first unit for closing a first opening portion for delivering a resin to a cavity and a second unit for closing a second opening portion for receiving the resin from a next mold located next to the intermediate mold, the next mold including a third unit for closing a third opening portion for receiving the resin, injecting the resin into the mold, closing the opening portions by the first unit, second unit, and third unit, and unloading the mold from the molding operation position after the resin is injected into the mold, where the first, second, and third opening portions are closed in this order.

3 Claims, 3 Drawing Sheets

(51) Int. Cl.
   *B29C 45/28* (2006.01)
   *B29C 45/32* (2006.01)

(52) U.S. Cl.
   CPC .. *B29C 45/322* (2013.01); *B29C 2945/76688* (2013.01); *B29C 2945/76755* (2013.01)

(58) Field of Classification Search
   CPC .......... B29C 2045/0425; B29C 45/076; B29C 2945/76755; B29C 2945/76688; B29C 45/322; B29C 45/28; B29C 45/0408; B29C 45/1756
   See application file for complete search history.

(56) References Cited

U.S. PATENT DOCUMENTS

| | | | | |
|---|---|---|---|---|
| 3,464,091 A * | 9/1969 | Bielfeldt | ............... | B29C 45/076 425/589 |
| 3,647,338 A * | 3/1972 | Ise | ............. | B29C 45/32 425/588 |
| 3,663,145 A * | 5/1972 | Teraoka | ............... | B29C 45/322 425/588 |
| 3,671,162 A * | 6/1972 | Lohmann | ............... | B29C 45/125 264/DIG. 83 |
| 3,694,529 A | 9/1972 | Josephsen et al. | | |
| 3,707,342 A * | 12/1972 | Lohmann | ............... | B29C 45/12 425/570 |
| 3,719,441 A | 3/1973 | Speak et al. | | |
| 3,973,892 A * | 8/1976 | Rees | ............... | B29C 45/125 425/572 |
| 4,400,341 A * | 8/1983 | Sorensen | ............... | B29C 45/12 264/328.8 |
| 4,753,592 A * | 6/1988 | Kaaden | ............... | B29C 45/12 425/572 |
| 4,867,668 A * | 9/1989 | Miyairi | ............... | B29C 45/2673 425/408 |
| 4,867,938 A * | 9/1989 | Schad | ............... | B29C 45/12 264/328.13 |
| 4,971,747 A * | 11/1990 | Sorensen | ............... | B29C 45/32 425/572 |
| 5,040,969 A * | 8/1991 | von Buren | ............... | B29C 45/12 425/572 |
| 5,043,129 A * | 8/1991 | Sorensen | ............... | B29C 45/572 425/572 |
| 5,052,915 A * | 10/1991 | Schad | ............... | B29C 45/12 425/572 |
| 5,145,353 A * | 9/1992 | Zakich | ............... | B29C 45/6771 425/588 |
| 7,833,008 B2 * | 11/2010 | Wimberger | ......... | B29C 45/1628 425/572 |
| 8,123,516 B1 * | 2/2012 | Morton | ................. | B29C 45/322 425/572 |
| 11,104,050 B2 | 8/2021 | Nakamura | | |
| 2003/0085483 A1 * | 5/2003 | Kroeger | ................. | B29C 44/424 425/449 |
| 2004/0070115 A1 * | 4/2004 | Kruger | ................. | B29C 45/125 264/328.8 |
| 2013/0302468 A1 * | 11/2013 | Ikeda | ................. | B29C 45/231 425/574 |
| 2018/0009146 A1 | 1/2018 | Nakamura | | |
| 2019/0118440 A1 | 4/2019 | Moriya et al. | | |

FOREIGN PATENT DOCUMENTS

| | | |
|---|---|---|
| JP | 2018-1738 A | 1/2018 |
| WO | 2020/117691 A1 | 6/2020 |

\* cited by examiner

MANUFACTURING METHOD, INJECTION MOLDING SYSTEM, AND MOLD

CROSS-REFERENCE TO RELATED APPLICATION

This application claims the benefit of U.S. Provisional Application 62/849,661, which was filed on May 17, 2019.

FIELD

The present disclosure relates to an injection molding system.

BACKGROUND

In manufacturing of molded parts by an injection molding machine, an injection process of filling a resin into a mold after clamping, a dwelling process of pressing the resin into the mold at a high pressure in order to compensate for a volume decrease due to solidification of the resin, a cooling process of keeping the molded part in the mold until the resin is solidified, and an ejecting process of ejecting the molded part from the mold are performed repeatedly.

In the above-described molding approach, a method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIG. 1 illustrates an injection molding system of US 2018/0009146/Japanese patent publication No. 2018-001738/VN20160002505.

In this system, cooling of the molds 100 is performed on the conveying machines 3A or 3B outside of the injection molding machine 2. During cooling of one of the molds, each process of molded part ejection→clamping→injection/dwelling is performed by the injection molding machine 2 for the other mold. Since opening and molded part ejection are performed by the injection molding machine 2, the conveying machines 3A and 3B do not need a function for opening and a function for molded part ejection.

This enables manufacture of the molded part P while alternating the plurality of the molds by the one injection molding machine 2. This can reduce the overall cost of the system.

If the time required for all processes from the start of the mold replacement process to the other mold ejecting process, injection process, and dwelling process, and up until completion of the mold replacement process again fits into the time required for cooling one of the molds then productivity compared to normal molding is improved by a maximum of two times. That is, in addition to suppressing cost increases, there is the merit that it is possible to realize high productivity.

A stack molding technology is known as a method of producing a plurality of plastic molded parts, which are relatively thin, in one injection molding operation. In this technology, it is common that the mold is divided into 3 parts. A hot runner in an intermediate mold and a resin path from a nozzle is divided into a plurality of paths in the intermediate mold. A valve for preventing the resin from leaking in the intermediate mold is also provided.

What is needed is an ability to perform stack molding while changing (alternating) multiple molds.

SUMMARY

A method for manufacturing a molded part by an injection molding machine while changing between multiple molds, the method comprising transporting a stack mold including an intermediate mold to a molding operation position located inside the injection molding machine, wherein the intermediate mold includes a first unit for closing a first opening portion for delivering a resin to a cavity and a second unit for closing a second opening portion for receiving the resin from a next mold that is located next to the intermediate mold, the next mold including a third unit for closing a third opening portion for receiving the resin from a nozzle of the injection molding machine, injecting the resin into the stack mold, closing the first opening portion by the first unit, closing the second opening portion by the second unit, and closing the third opening portion by the third unit, and unloading the stack mold from the molding operation position after the resin is injected into the stack mold, wherein, the first opening portion, the second opening portion, and the third opening portion are closed in this order.

This and other embodiments, features, and advantages of the present disclosure will become apparent upon reading the following detailed description of exemplary embodiments of the present disclosure, when taken in conjunction with the appended drawings, and provided claims.

Figure 1:
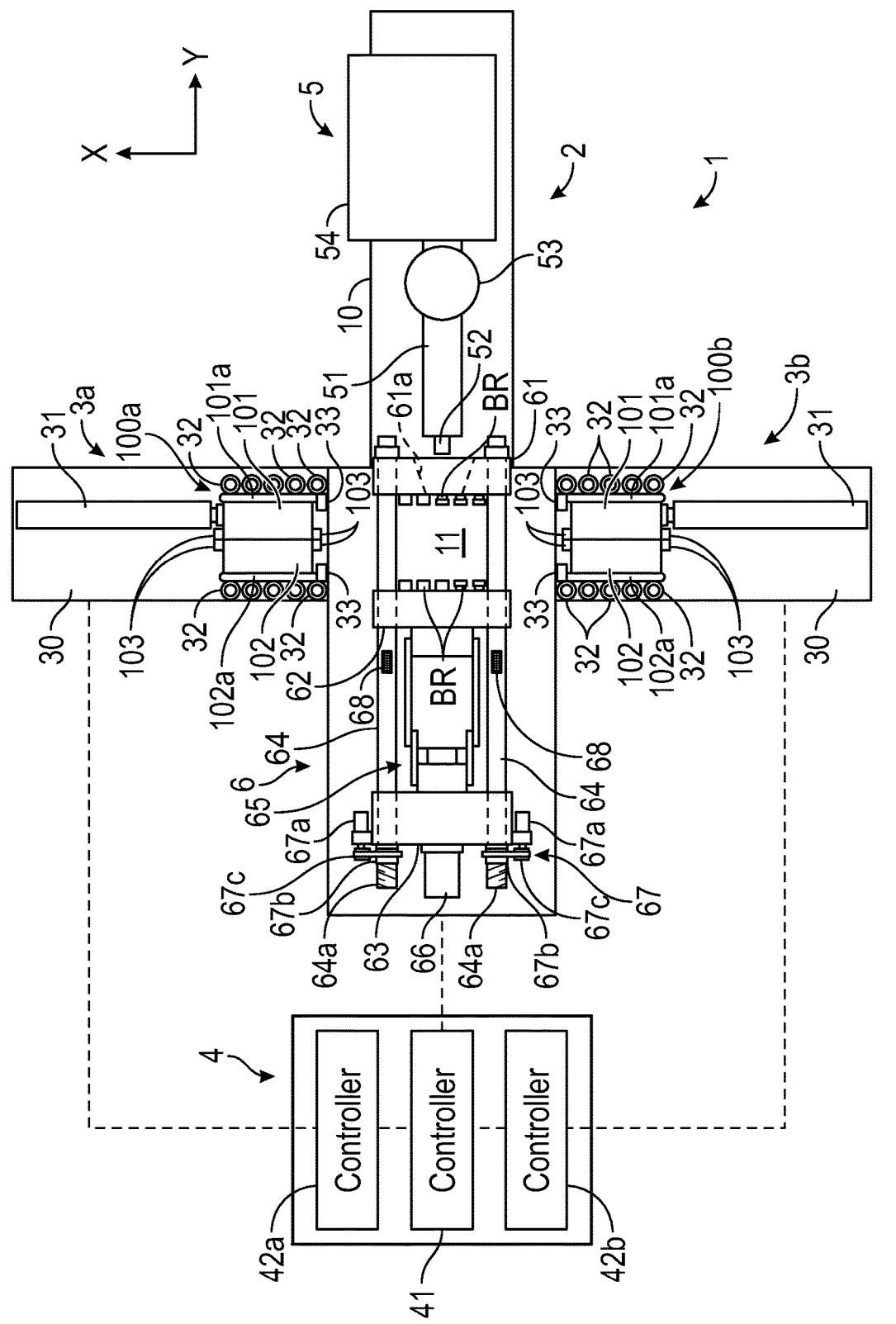
FIG. 1 is a plan view of an injection molding system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, the arrow symbols X and Y in each Figure indicate horizontal directions that are orthogonal to each other, and the arrow symbol Z indicates a vertical (upright) direction with respect to the ground.

FIG. 1 illustrates injection molding system 1 of US 2018/0009146/Japanese patent publication No. 2018-001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the injection molding machine.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y-axis direction along a rail 12 on the frame 10, and in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The injection molding machine 2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

An opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below.

Figure 2:
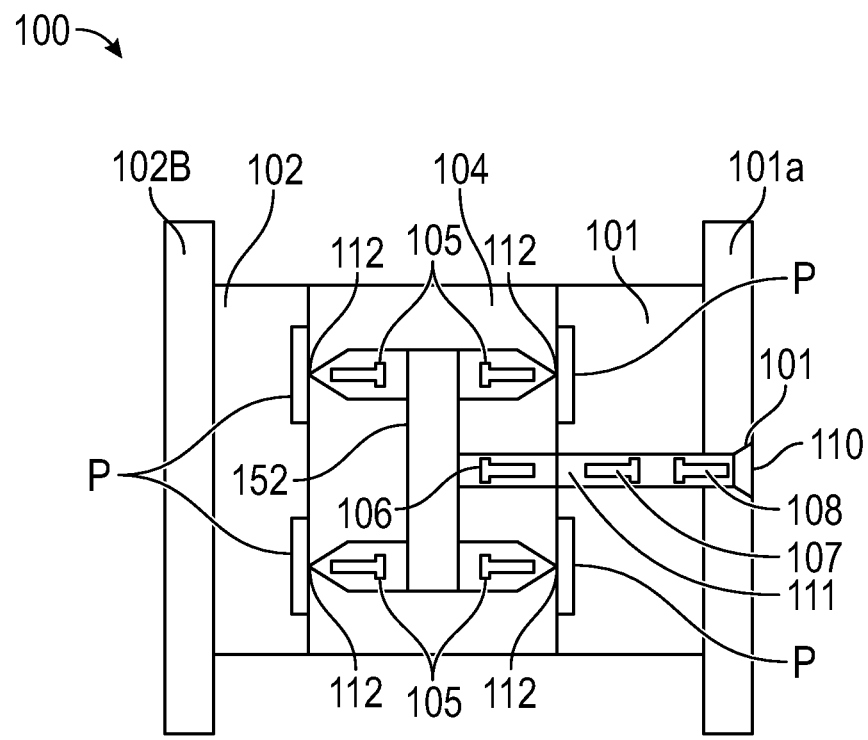
FIG. 2 illustrates a close state of a mold.
Figure 3:
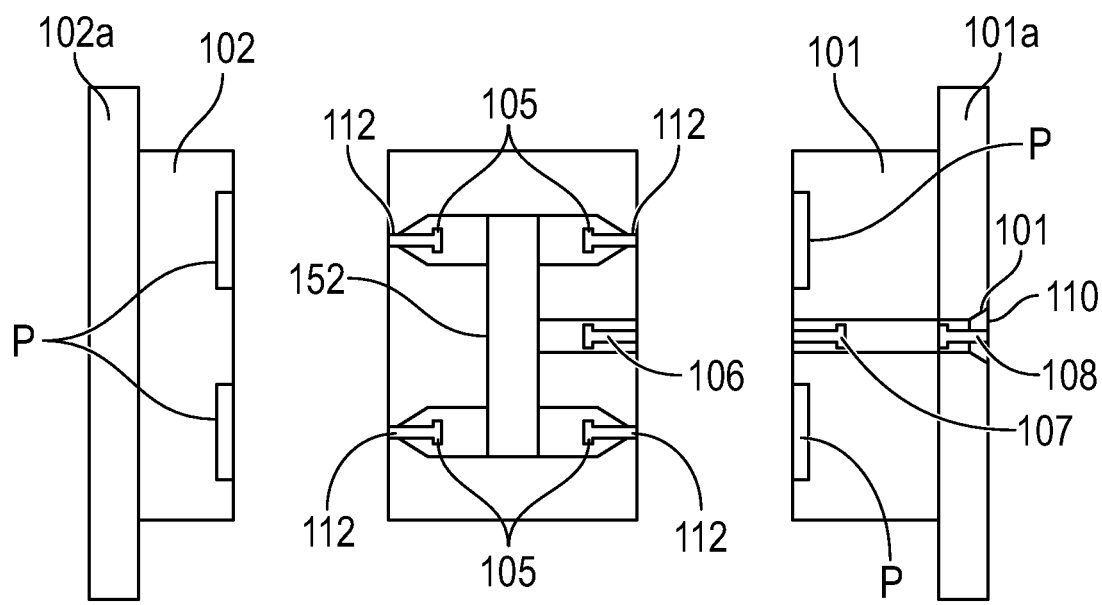
FIG. 3 illustrates an open state a mold.

FIG. 2 and FIG. 3 illustrate the mold 100A/100B according to an exemplary embodiment. FIG. 2 illustrates a close state of the mold 100A/100B, while FIG. 3 illustrates an open state of the mold 100A/100B.

An opening port 110 for receiving the resin from nozzle 52 of the injection molding machine 2 and delivering the resin inside a stack mold 100, and is formed in the fixed mold 101. The injected resin flow through a path in the fixed mold 101 and the intermediate mold 104, and reach four cavities. Wall 152 forms the path, and it extends from the fixed mold 101 to an intermediate mold 104 and the cavities.

An opening port 111 is formed on both the fixed mold 101 and the intermediate mold 104. The opening port 111 on the side surface of the fixed mold 101 is connected to a channel inside the fixed mold 101, extending from the opening port 110 to the opening port 111. The opening port 111 on the intermediate mold 104 is connected to a channel inside the intermediate mold 104, extending from the opening port 111 and branching to each of the opening ports 112. The wall 152 defines this channel in the intermediate mold 104.

The opening port 111 on the side surface of the fixed mold 101 and the opening port 111 on the side surface of the intermediate mold 104 mate with each other to form a channel extending from the fixed mold 101 to the intermediate mold 104.

The opening port 111 receives the resin injected from the nozzle 52 and received at the opening port 110 of the fixed mold 100, and delivers the resin into an inner area of the intermediate mold 104.

The opening port 112 is formed on the intermediate mold 104, the movable mold 102, and the fixed mold 101. The opening port 112 on the side surface of the intermediate mold 104 and the opening port 111 on the side surface of the movable mold 102 mate with each other to form a channel extending from the intermediate mold 104 to the cavity in the movable mold 102. The opening port 112 on the side surface of the intermediate mold 104 and the opening port 111 on the side surface of the fixed mold 101 mate with each other to form a channel extending from the intermediate mold 104 to the cavity in the fixed mold 101.

The opening port 112 receives the resin injected from the nozzle 52, delivered through the opening 110 and received at the opening port 111, and delivers the resin into the cavities of the stack mold 100. The resin injected into the cavity becomes the molded part P by being cooled. A plurality of shut-off units are located in the middle of the path. The shutoff units can collectively be referred to as a shutoff mechanism.

Shut-off unit 105 can open/close the opening port 112 to the cavity. Shut-off units 106, 107 can open/close the opening port 111 between the fixed mold 101 and the intermediate mold 104. Shut-off unit 108 can open/close the opening port 110.

FIG. 3 illustrates an open state of the mold 100A/100B. After injecting the resin, all shut-off units 105, 106, 107, 108 close their respective openings. The mold 100A/100B is then opened.

Figure 4:
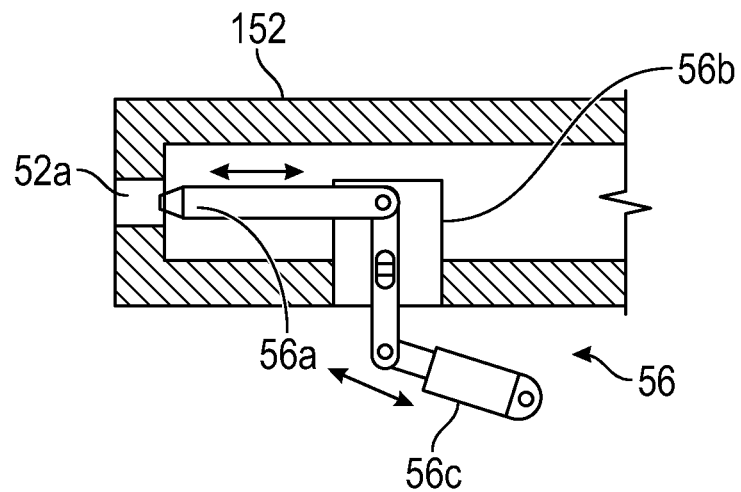
FIG. 4 illustrates a configuration of shut-off units.

FIG. 4 illustrates the configuration of each of the shut-off units 105, 106, 107, 108. An opening/closing mechanism 56 in FIG. 4 includes a pin 56a for opening/closing an opening port 52a. The pin 56a connects to an actuator (cylinder) 56c via a link 56b. Operation of the actuator 56c causes the opening port 52a to open and close. The actuator 56c is powered via a cable connected to the mold 100A/100B. The controller 40 controls the actuator 56c. After injecting the resin into the cavity, the controller 40 controls the actuator 56c to close the opening ports 110, 111, 112.

Figure 5:
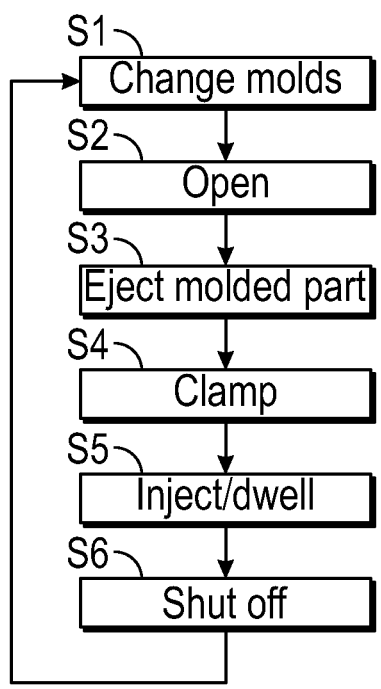
FIG. 5 illustrates an injection molding process.

FIG. 5 illustrates an injection molding process according to the exemplary embodiment. The injection molding process is performed for the mold 100A/100B conveyed in the injection molding machine 2. Control based on the flowchart in FIG. 5 is executed by the CPU included in the control apparatus 4 based on a program stored in the ROM.

In S1, the molds are changed (alternated). In S2, the clamping apparatus 6 is driven and the mold 100A/100B conveyed in the injection molding machine 2 is opened. In S3, the molded parts are removed from the opened mold 100A/100B. In S4, the clamping apparatus 6 is driven again such that a distance between the fixed platen 61 and the movable platen 62 is reduced, and the mold 100A/100B is closed.

In S5, the resin is injected into the closed mold 100A/100B. In S6, the controller 41 drives the actuators 56c corresponding to shut-off units 105, 106, 107, 108 so that the opening portions 112, 111, 110 are closed in this order. This can prevent pressure applied to the molded part P from affecting the After the opening portions 112, 111, 110 are completely closed, the controller 41 transmits an instruction to convey the molds 100A and 100B to the controller 42A and the controller 42B. This can prevent the pressure applied to the molded part P from leaking to a hot runner (not illustrated) and the injection molding machine 2. This can result in improving the quality of the molded part P and suppressing a string-problem of the resin that can be caused by opening portions 112, 111, 110 are closed in different order.

The string-problem of the resin is caused by leaking of the resin from the opening portions 112, 111, 110. For example, in a case where the resin leaks from the opening portion 110, long threadlike resin is formed between the nozzle 52 and the fixed mold 101. The long threadlike resin attaches around the injection molding machine 2 based on the movement of the nozzle 52, which can increase labor and time to remove the long threadlike resin.

If, for example, the opening portions 112, 110, 111 are closed in this order, the resin can leak out in the next injection molding operation because the pressure remains in the hot runner. If the opening portions 111, 112, 110 are closed in this order, the pressure applied by the injection molding machine 2 is cut at the opening portion 111, which can result desirable pressure not being applied to the molded part P.

There is an opening portion 111 formed in the intermediate mold 104 and an opening portion 111 formed in the fixed mold 101. To close these opening portions 111, shut-off unit 106 is provided in the intermediate mold 104 and shut-off unit 107 is provided in the fixed mold 107. The shut-off unit 106 and the shut-off unit 107 can be closed in any order or at the same timing. It is preferable that an earlier one of either the closing timing of the shut-off unit 106 or the closing timing of the shut-off unit 107 is between the closing timing of the opening portion 112 and the closing timing of the opening portion 110. According to another exemplary embodiment, a mold can have only one of the shutoff unit 106 and shutoff unit 107.

In another exemplary embodiment, the shut-off units 105, 106, 107, 108 can be the same mechanism as illustrated in FIG. 4. In yet another exemplary embodiment, a different method for closing the opening portion 52a can be implemented.

In the above-described embodiment, the mold 100A/100B cavities are in both the fixed mold 101 and the movable mold 102. According to another exemplary embodiment, a cavity is formed in only one of a move part and a fix part of a mold.

In the above-described embodiment, the shutoff pins 105, 106, 107, 108 are inserted horizontally into the openings 110, 111, 112 at endfaces of the fix mold 101, the moveable mold 102 and the intermediate mold 104, to shut off the flow path. According to another exemplary embodiment, the shutoff mechanism shuts off the flow path in a mold by vertically or obliquely inserting a shutoff mechanism into a channel in the mold at a position shifted from an end face of a mold.

The shutoff units can adopt various different configurations and are not limited to the specific configurations described above.

In the above described embodiments, a pin of the shutoff mechanism has a tapered distal end and the tapered distal end is inserted into the channel connected to the opening to shut off the flow path. Insertion of the pin need not necessarily necessary shut off the flow of the material entirely. There can be a gap between the channel and the pin inserted into the channel due to, for example, a manufacturing variation of the pin and the channel. In other words, the pin need only interfere the flow of the material in the channel to reduce or substantially resolve the issue of leaking material (or string problem).

As described above, in the present embodiment, the injection molding machine 2 performs the injection molding with a mold, and performs the closing operation of the shut-off units 105, 106, 107, 108 in the above-described order. The mold is then moved to the conveying machines 3A or 3B, where the mold is cooled.

According to the above-described embodiments, leaking of the resin and a string-problem can be suppressed when the mold is opened.

According to the above-described embodiments, the mold is moved after the opening portion 110 is closed, such that stack molding is performed while changing (alternating) multiple molds. By controlling the order of closing the opening portions, the quality of the molded part P is good and the string-problem is suppressed.

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

What is claimed is:

1. A mold used in an injection molding system including an injection molding machine and a conveyance apparatus configured to convey the mold to a molding operation position in the injection molding machine, the mold comprising:

a first mold including a first unit configured to close a first opening portion for injecting a resin to a cavity;

a second mold;

an intermediate mold located between the first mold and the second mold, the intermediate mold including a second unit configured to close a second opening portion for receiving the resin from the first mold and a plurality of ports, with each port of the plurality of ports being connected to the cavity, which extends through the intermediate mold; and a third unit configured to close a third opening portion for receiving the resin from a nozzle of the injection molding machine, wherein, with the first unit and the second unit in an open configuration, the resin flows from the first mold, through the intermediate mold, into a plurality of mold cavities on a face of the first mold and into a plurality of mold cavities on a face of the second mold.

2. The mold of claim 1, wherein the first unit, the second unit and the third unit are configured to, after injecting the resin into the cavity, close the first opening portion, the second opening portion and the third opening portion in this order.

3. The mold of claim 1, further comprising:

a first opening port positioned on a side surface of the second mold; and a second opening port positioned on a side surface of the intermediate mold, formed in the first mold, the intermediate mold, and the second mold, wherein the first opening port and the second opening port are configured to form a channel extending from the intermediate mold to the cavity.

* * * * *